Aug. 8, 1961     J. O. MELTON ET AL     2,995,381

IDLER ARM ASSEMBLY

Filed Sept. 24, 1959     2 Sheets-Sheet 1

INVENTORS
JAMES O. MELTON &
BY   THOMAS B. WILKINSON

ATTORNEY

United States Patent Office
2,995,381
Patented Aug. 8, 1961

2,995,381
IDLER ARM ASSEMBLY
James O. Melton, Norman, and Thomas B. Wilkinson, Oklahoma City, Okla., assignors to Jamco, Inc., Oklahoma City, Okla., a corporation of Oklahoma
Filed Sept. 24, 1959, Ser. No. 842,015
10 Claims. (Cl. 280—95)

This invention relates to improvements in threaded bearing couplings between relatively oscillating members, and more particularly, but not by way of limitation, to improvements in vehicular steering gear idler arm assemblies.

Automobiles, as manufactured today, typically are steered with a system actuated by a hand wheel which is connected to the steering pivots by means of gears and linkages. The rotation of the hand wheel is communicated by a horizontal shaft at the base of the hand wheel or steering column to a worm gear, screw or cam mechanism. A lever at the end of this horizontal shaft transmits the turning motion, through an intervening link, to a pivot on which a front wheel is mounted. The other front wheel is also mounted on a similar pivot and the two pivots are linked together by means of a cross rod, or "drag link" as it is often termed, so that the two front wheels move simultaneously, keeping their proper relative position.

The cross rod is supported at one end by the lever associated with the hand wheel mechanism. Previously, it was a policy to permit the other end of the cross rod to remain unsupported. However, it has been learned that, particularly when ball joint suspension of the wheels is used, improved steering is obtained by pivotally supporting both ends of the cross rod. Thus, an idler arm must be provided, supporting one end of the cross rod with the frame of the automobile.

A threaded-type bearing has been found adaptable as this pivotal bearing required for the idler arm. This threaded bearing is subjected to a great amount of stress and vibration, and consequently, the threads within the bearings soon become worn. This permits a certain amount of slack and play in the steering mechanism, permitting the front wheels of the car to vibrate or oscillate at high speeds. One example of means which has been proposed to help eliminate the slack or play which develops in threaded bearings includes the use of a ball bearing between the bracket and idler arm, exerting a compression force between the threads thereof by means of a compressible or elastic material. This has resulted in improved performances of the steering characteristic of the idler arm. However, the front end mechanism of an automobile is exposed to a great amount of dirt, mud and water. A mechanical bearing is thus very quickly contaminated and the life expectancy thereof is necessarily shortened. Also, the compressive characteristic of the elastic-type material used is of such a nature that constant stress and vibration tends to quickly reduce its elastic characteristic. This requires more frequent adjusting of the compression on the elastic member to maintain proper force on the threads between the bracket and the pivot arm.

It is therefore an object of our invention to overcome these objections in threaded bearing means for relatively oscillating members.

Another object of this invention is to provide a means of maintaining tension between the threads of the bracket member and the threads of the idler arm without the use of a ball bearing member.

Another object of our invention is to provide apparatus for maintaining tension between the threads in a threaded bearing mechanism which will be relatively simple, less expensive and of a longer lasting nature than means previously disclosed.

A still further object of this invention is to provide apparatus for maintaining tension in a threaded bearing which is readily adapted to replace existing and prior apparatus.

These and other objects, and a better understanding of this invention may be had by referring to the following description and claims when taken in conjunction with the drawings of which:

Figure 1:
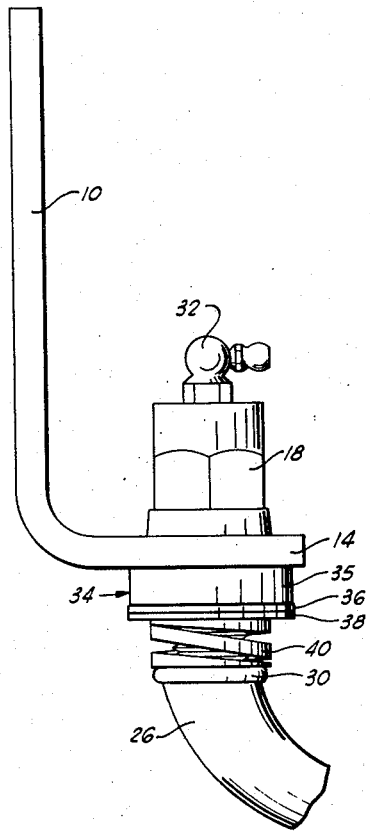
FIGURE 1 is a side elevation of the supporting bracket, idler arm, and bearing assembly according to this invention.
Figure 2:
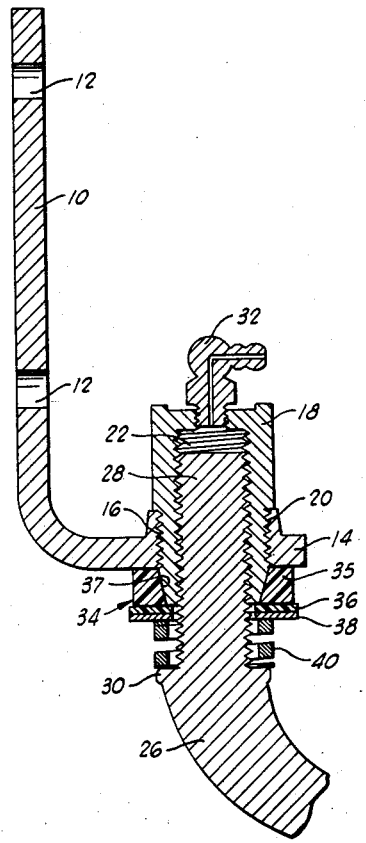
FIGURE 2 is a vertical cross-sectional view of the structure shown in FIGURE 1.
Figure 3:
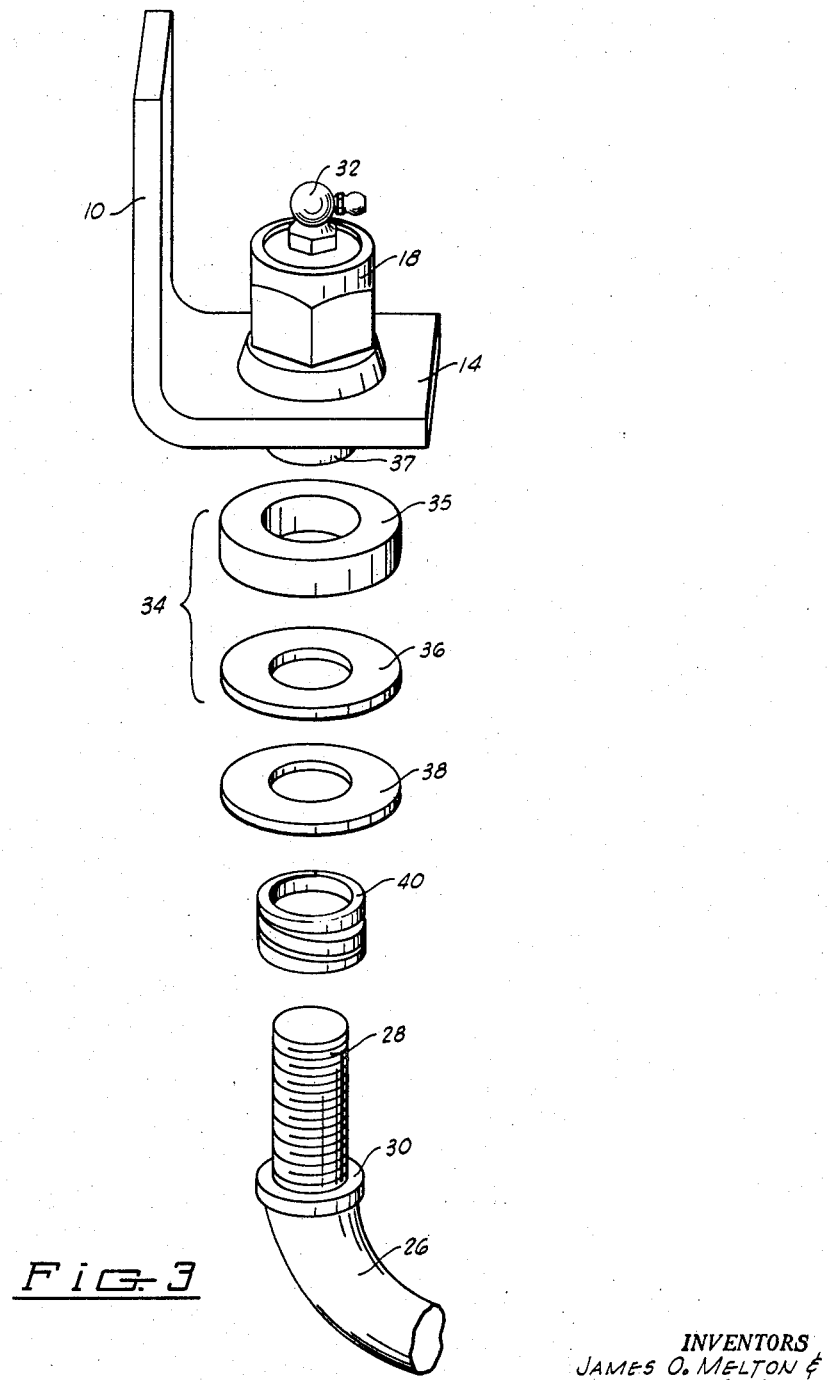
FIGURE 3 is an exploded view showing the several elements detached from each other and in the relationship as shown in FIGURE 1 and FIGURE 2.

Referring now to the drawing, reference numeral 10 designates the bracket which is supported to the automobile chassis by use of bolt holes 12. The bracket lower portion 14 has a threaded opening 16. A tubular bearing member 18 is provided with external threads 20 and internal threads 22, and is threaded firmly into opening 16 of the bracket lower portion 14 using well known wrench means. In some instances, bearing member 18 is formed as an integral part of bracket lower portion 14, rather than as a separate component, as shown in the drawings.

The idler arm 26, typically is pivotally connected to the "drag link," not shown, and terminates in a male threaded portion 28. The threaded portion ends at an integrally formed peripheral flange 30 on the idler arm. The threaded portion 28 threadably engages the internal threads 22 of bearing member 18, and this threaded engagement constitutes what is termed a screw or threaded bearing. The improvement of the performance of this type of bearing is an essential element of this invention.

A grease fitting 32 is provided in the upper end of the bearing member 18 to facilitate lubrication of the threaded bearing. The lower end portion 33 of the bearing member 18 protrudes beyond the lower surface of bracket portion 14 and normally has its outer surface tapered downwardly and inwardly.

An annular bearing, generally designated by reference character 34, is positioned around the threaded portion 28 and the lower end portion 33 of the bearing member 18 to facilitate the application of pressure on the threaded bearing, with a minimum of friction, as will be described. The bearing 34 comprises two bearing sleeves 35 and 36 formed out of high density synthetic resin materials. Typical of the materials which have proven satisfactory for this application include: polymerized olefins, one such as sold under the trade name "Marlex"; polymerized tetrafluoroethylene, such as sold under the trade name "Teflon"; and long chain synthetic polymeric amides, such as sold under the trade name "Nylon." In practice, it has been found that superior results are obtained when bearing sleeve 35 is made of polymerized ethylene plastic, and when bearing sleeve 36 is made of either polymerized tetrafluoroethylene plastic or a long chain polymeric amide plastic. This is due to the fact that superior results obtain when two contacting bearing surfaces are employed which are constructed of high density resins having dissimilar molecular structures, as further explained below, and also to the superior antifrictional properties of the polymerized ethylene plastic which make it attractive for use as one of the two dissimilar resinous materials utilized.

In the embodiment illustrated, the sleeve 35 is substantially thicker than the sleeve 36 and has its inner bore 37 tapered to conform to the configuration of the lower end 33 of the bearing member 18, such that the sleeve 35 will remain fixed in position with the member 18 during use of the device, as will be described. However, the sleeves 35 and 36 may be of any desired relative thicknesses and still operate efficiently as a bearing. A metal washer 38 is held against the bearing sleeve 36 by a spring 40. As will be observed, the spring 40 is helical and bears against the flange 30 at its lower end to apply pressure between the idler arm 26 and the bracket 10 through the bearing 34.

The operation of this invention may be described as follows. The bearing member 18 is first secured within the lower portion 14 of bracket 10, firmly, so that it will not be loosened by vibration during normal operation of the automobile. Spring 40, metal washer 38, and bearing 34 are inserted on the idler arm threaded portion 28 in the order shown on the drawings. The threaded portion 28 is then threaded into the internal threads 22 of bearing member 18 until compression is exerted by spring 40. The other end of the idler arm 26, not shown on the drawing, can then be affixed to the cross link mechanism of the automobile.

It has been learned that the surfaces of certain synthetic plastics have a natural lubricative characteristic, especially surfaces resulting from the contact of dissimilar plastics. The superiority of the bearing formed by utilizing dissimilar plastics instead of identical resins is due to the tendency of the abutting surfaces of two bearing members formed of an identical plastic to adhere to each other. This tendency to adhere is in turn believed to be due to the chemical affinity of the identical molecules in the two opposed surfaces which causes them to condense or polymerize with each other under the influence of the pressure and heat which exist during the conditions of operation. On the other hand, if the two bearing surfaces are formed of molecules which differ in structure or chain length, such affinity is reduced or eliminated. One of the novel features of this invention involves the application of this lubricating characteristic. As the idler arm 26 pivots with reference to bracket 10 during operation of the steering mechanism of an automobile, movement takes place between the threaded portion 28 and the internal threads 22 of the cup-like bearing 18. Tension is maintained on this bearing relationship by the force exerted through spring 40. This force is transmitted to the metal washer 38 and bearing 34. In the embodiment shown, pivotal movement will take place between bearing sleeve 36 and bearing sleeve 35 because of the lubricative characteristic which causes this surface to have a much smaller degree of friction than the other surfaces in the arrangement. Thus, it can be seen that tension will be exerted at all times to prevent any slack or play which may be formed between the threaded portion 28 of idler arm 26 and the internal threads 22 of bearing member 18.

Lubrication is required between the metallic internal threads 22 and threaded portion 28, but due to the lubricative characteristics existing between bearing sleeve 36 and bearing sleeve 35, no external lubrication is required, thereby insuring a longer useful life of mechanism. The stable self-sealing characteristic of the materials used precludes deleterious action from dust, water and mud which contacts the steering mechanism of automobiles. It can be seen that the principles of this invention are readily adaptable to any relatively oscillating threaded bearing members.

Although this invention has been described with a certain degree of particularity, it is manifest that many changes may be made in the details of construction and arrangements of the components without departing from the spirit or the scope of this disclosure, as set forth in the appended claims.

We claim:

1. An idler arm assembly for pivotally supporting the cross link of an automobile steering mechanism to the chassis, comprising, in combination, a bracket disposed to be supported to said chassis, said bracket having a threaded opening; an idler arm having one end terminating in a threaded portion, and having an integrally formed peripheral flange adjacent said threaded portion; a bearing member having external threads disposed to engage said threaded opening of said bracket and internal threads disposed to receive said threaded portion of said idler arm, said bearing member having a tapered end portion protruding beyond said external threads; annular-shaped, high density synthetic resin bearing means positioned on the tapered end portion of said bearing member between said bracket and said peripheral flange; said resin bearing means comprising a first portion frictionally engaging said bracket and remaining stationary relative thereto during movement of said arm, and a second portion bearing against said first portion and moving with said arm and relatively to said first portion during movement of said arm; a metal washer axially received about said threaded portion of said idler arm in adjacent contact with said bearing means; and a spring disposed to receive said threaded portion of said idler arm and to be compressibly positioned between said peripheral flange of said idler arm and said metal washer.

2. An assembly according to claim 1 wherein said bearing means comprises a pair of bearing sleeves formed of synthetic resin materials.

3. An assembly according to claim 2 wherein said bearing sleeves are formed of dissimilar synthetic resinous materials.

4. An assembly according to claim 3 wherein one of said bearing sleeves is composed of a polymerized olefin material and the other bearing sleeve is composed of a polymerized tetrafluoroethylene material.

5. A device according to claim 3 wherein one of said bearing sleeves is composed of a polymerized ethylene material and the other bearing sleeve is composed of a polymerized amide material.

6. A device according to claim 2 wherein the inner periphery of one of said bearing sleeves is tapered to conform to the tapered end portion of said bearing member and remain fixed on said bearing member during pivotal movement of the idler arm.

7. A pivotal bearing device comprising, in combination, a bracket having a threaded opening; an arm having an extended threaded end portion engaging said threaded opening of said bracket; high density synthetic resin bearing means having an axial opening for receiving said threaded end portion of said arm and disposed in juxtaposition to said bracket, said resin bearing means comprising a first portion frictionally engaging said bracket and remaining stationary relative thereto during movement of said arm, and a second portion bearing against said first portion and moving with said arm and relatively to said first portion during movement of said arm; and means around said arm and bearing against said second portion of said high density synthetic resin bearing means for compressively retaining said first portion of said high density synthetic resin bearing means in contact with said bracket.

8. A device according to claim 7 wherein said means for compressively retaining said first portion of said high density synthetic resin bearing means in contact with said bracket comprises a helical spring around said threaded portion of said arm.

9. A device according to claim 8 wherein said bearing means comprises a pair of bearing sleeves formed out of dissimilar synthetic resins.

10. A device according to claim 9 including a metal washer having an axial opening disposed to receive said threaded portion of said arm, said metal washer being disposed between said bearing means and said spring.

(References on following page)

References Cited in the file of this patent

UNITED STATES PATENTS

| | | |
|---|---|---|
| 2,200,643 | Smith | May 14, 1940 |
| 2,642,318 | Ricks | June 16, 1953 |
| 2,689,756 | Carlson | Sept. 21, 1954 |
| 2,844,382 | Dick | July 22, 1958 |
| 2,913,251 | Herbenar | Nov. 17, 1959 |
| 2,921,809 | Kogstrom | Jan. 19, 1960 |
| 2,944,829 | Herbenar | July 12, 1960 |